United States Patent [19]

Barns et al.

[11] 4,372,834
[45] Feb. 8, 1983

[54] PURIFICATION PROCESS FOR COMPOUNDS USEFUL IN OPTICAL FIBER MANUFACTURE

[75] Inventors: Robert L. Barns; Edwin A. Chandross, both of Berkeley Heights; Daniel L. Flamm, Chatham Township, Morris County; Louis T. Manzione, Summit; Larry F. Thompson, Gillette, all of N.J.

[73] Assignee: Bell Telephone Laboratories, Incorporated, Murray Hill, N.J.

[21] Appl. No.: 275,426

[22] Filed: Jun. 19, 1981

[51] Int. Cl.³ ............................................. B01J 19/08
[52] U.S. Cl. ............................................. 204/157.1 R
[58] Field of Search ............... 204/157.1 P, 157.1 R

[56] References Cited

FOREIGN PATENT DOCUMENTS 247241 9/1963 Australia ................ 204/157.1 P

OTHER PUBLICATIONS

Clark et al., Appl. Phys. Lett. 32(1), Jan. 1, 1978, pp. 46-48.

Primary Examiner—Howard S. Williams
Attorney, Agent, or Firm—Bruce S. Schneider

[57] ABSTRACT

Silicon tetrachloride is processed to ultrahigh purity by subjecting it to a specific succession of purification steps. These steps include the photochlorination of the SiCl₄ using a reactor that allows a long residence time for the SiCl₄. After photochlorination, highly volatile products such as HCl are removed and the remaining impurities are then separated by a distillation technique.

12 Claims, 3 Drawing Figures

PURIFICATION PROCESS FOR COMPOUNDS USEFUL IN OPTICAL FIBER MANUFACTURE

BACKGROUND OF THE INVENTION

1. Field of the Invention

This invention relates to purification of chemical compounds and, in particular, the purification of compounds related to optical fiber manufacture.

1. Art Background

The compounds $SiCl_4$ and $GeCl_4$ are commonly used in the preparation of glass bodies such as optical fibers. In the production of these bodies, the chloride glass former $SiCl_4$ is reacted with oxygen to form silicon oxides and the chloride glass former $GeCl_4$ is reacted with oxygen to form the dopant $GeO_2$. (In operation the chlorides are converted to oxides which then form the glass. However, for pedagogic purposes $SiCl_4$ and $GeCl_4$ are termed chloride glass formers.) The silicon oxides thus are doped with a material such as germanium dioxide that produces a desired refractive index configuration in the glass body being formed from the $SiCl_4$. At one time or another, a plethora of impurities has been reported to be present in chloride glass forming compounds. However, small amounts of $SiHCl_3$, for example, present in $SiCl_4$ have been identified as producing a disproportionate degree of degradation to the transmission properties of the final fiber. Trichlorosilane is also generally the impurity occurring in the greatest quantities, e.g., at concentration levels that are hundreds of times greater than other impurities. Therefore, purification efforts have been directed to the removal of the impurity, $SiHCl_3$ that is considered to degrade significantly the properties of optical fibers. It has been found that fibers made using $SiCl_4$ which contains 200 ppm or more of $SiHCl_3$ significantly attenuate signals in several regions of the advantageous wavelength region between 0.9 and 2.5 $\mu m$ that are guided by the fibers. This attenuation results from the absorption of OH moieties incorporated into the fibers through the presence during fiber production of impurities having available hydrogen.

Various methods have been developed to remove trace amounts of $SiHCl_3$. For example, conventional distillation of $SiCl_4$ has been employed to remove this impurity. (See U.S.S.R. Patent Specification and Inventor's Certificate by I. D. Spevak et al published Apr. 25, 1976, Bulletin No. 15, Application No. (21)1453563/23-26). The use of photochlorination to remove $SiHCl_3$ has been described. (See Offenlegungsschrift No. 2805824.) This technique is based on the well-known reactivity of Si—H bonds with halogens. Chlorine gas is dissolved in the chloride glass former that is to be purified and the glass former is introduced into a region that is illuminated by light having a wavelength of about 240 to 400 nm. The chlorine is induced by the light to react with $SiHCl_3$ to produce $SiCl_4$ and HCl. Since this photochlorination process is extremely rapid, short treatment times are possible and are utilized to achieve high throughput.

SUMMARY OF THE INVENTION

Although it is commonly known that trace amounts of $SiHCl_3$ in chloride glass formers cause serious degradation of optical fibers formed from contaminated glass former, other hydrogen containing impurities such as C—H containing compounds (e.g., hydrocarbons, partially chlorinated hydrocarbons) and silanols and, additionally, soluble forms of iron, and iron containing particulate matter, even in relatively small quantities, significantly degrade the optical properties of fibers produced from material containing them by also introducing OH moieties or other entities that absorb light in wavelength regions used in optical fiber systems. For example, compounds containing C—H bonds should not be present in $SiCl_4$ or $GeCl_4$ in concentrations greater than 20 ppm. Advantageously, the removal of these undesirable impurities concomitant with the removal of $SiHCl_3$ is achieved by the inventive purification process. Further, it is possible in a continuous feed process to accomplish impurity removal or deactivation, i.e., the conversion of an undesirable impurity such as a silanol to a compound, such as a siloxane, that does not introduce an undesirable component into the fiber. Thus, the delays of batch processing are avoidable.

In the first step of the subject process, the chloride glass former is photochlorinated in the presence of a chlorine containing compound, e.g., $Cl_2$, that yields atomic chlorine upon irradiation with ultraviolet light. Compared to $SiHCl_3$, substantially longer exposure to the atomic chlorine produced by photodissociation is required to substantially chlorinate impurities such as hydrocarbons. In contrast to previous practices, to ensure adequate chlorination relatively substantial quantities of the material supplying atomic chlorine, e.g., $Cl_2$, are employed in conjunction with a lengthened residence time in the photochlorinator (27 in FIG. 3). After performing the extended exposure photochlorination, the bulk of the HCl produced by this process and any excess $Cl_2$ are removed by techniques such as countercurrent nitrogen stripping. The material is then introduced into a distillation column, 9, having high recovery and reflux ratios.

The distillation column (referred to as the first distillation column) employed in conjunction with the stripping operation, 7, serves two purposes. First, it has been found that the hydroxylic hydrogen present in silanols and similar undesirable hydroxylic impurities are most efficiently removed by refluxing the $SiCl_4$ in an environment substantially free of HCl. The stripper removes the bulk of the HCl while the high reflux ratio distillation column, 9, provides the necessary reflux condition. Thus, the combination is advantageously utilized to allow production of a highly purified chloride glass former which is subsequently used for the fabrication of an excellent fiber.

Secondly, this first distillation column is also used with another column, 10, to further enhance the purity of the glass former being processed. Only a small amount of the glass former being purified reaches the top of the first column and, thus, is discarded. The material settling to the bottom is removed and introduced into a second distillation column, 10, also with a relatively high $SiCl_4$ recovery ratio. The combination of the two specifically tailored columns removes the generally less volatile C—Cl containing impurities produced by the photochlorination of undesirable entities such as those containing multiple C—H bonds. This phenomenon is particularly important since even if a compound having more than one C—H bond is only partially chlorinated, it is still removed by the subject invention. Additionally, contaminants such as iron containing particulate solid matter and soluble iron which have been found to be quite undesirable are removed by the distillation. By using this system a very high purity glass former, e.g., SiCl₄ is obtained and extremely good optical fibers are produced.

A further benefit of the use of appropriate operating conditions in the photochlorinator and appropriately chosen distillation columns is the relative independence of the quality of the purified SiCl₄ with respect to the impurity level of the feed stock. Thus, SiCl₄ with substantially varying impurity levels is adequately purified without substantially changing operating conditions or apparatus configuration.

DETAILED DESCRIPTION

It has been found that it is advantageous to reduce C-H containing groups in SiCl₄ or GeCl₄ to less than 20 ppm, preferably less than 5 ppm, (expressed as C—H group content), iron to less than 20 ppb, preferably less than 2 ppb, and silanols, expressed as OH group content, to less than 20 ppm, preferably less than 5 ppm, to advantageously improve the optical properties of fibers made from chloride glass formers. (For pedagogic purposes, the remainder of the description is in terms of SiCl₄. However, it is possible to remove undesirable impurities from GeCl₄ using the same procedure.)

Figure 1:
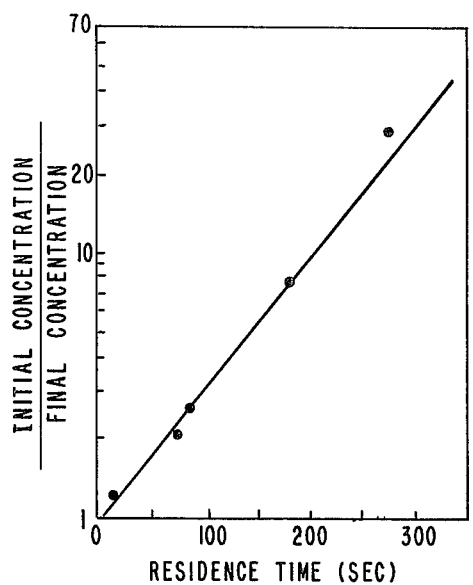
FIG. 1 and 2 illustrate reaction parameters associated with the inventive process and FIG. 3 indicates an embodiment of the subject process.
Figure 2:
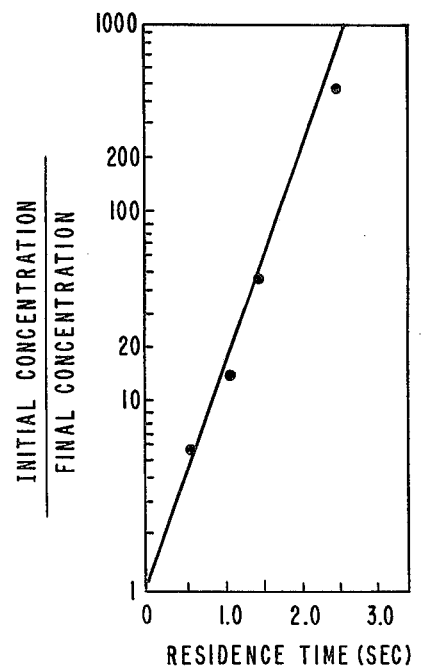
Figure 3:
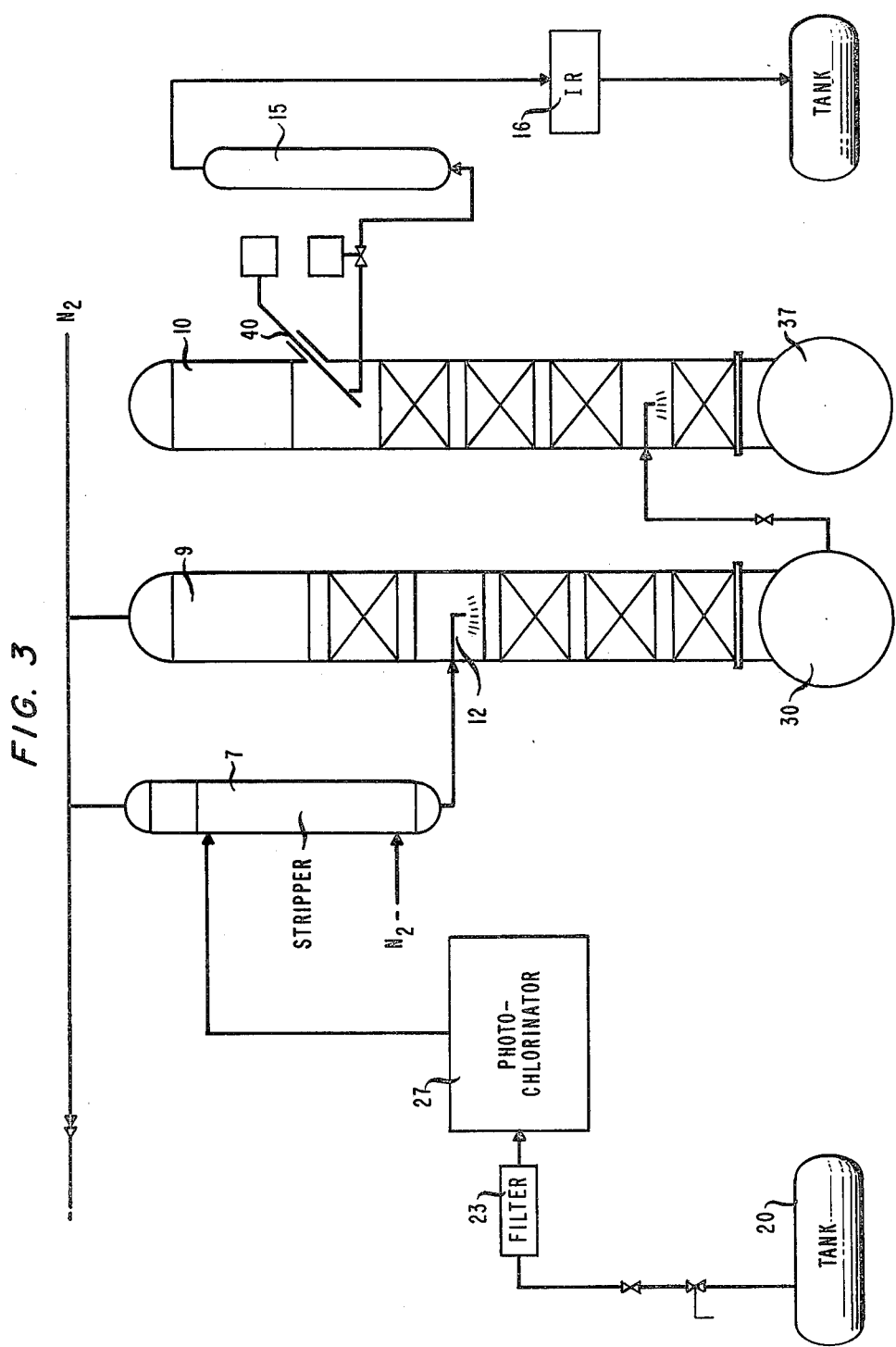

To ensure the adequate removal of $SiHCl_3$, the photochlorination should be done in the substantial absence of oxygen, i.e., a dissolved oxygen level generally less than 500 ppm preferably less than 100 ppm. The meticulous removal of C—H containing compounds to enhance fiber quality relies not only on the absence of oxygen, but also on the use of a specifically tailored photochlorination step in conjunction with appropriate stripping and distillation steps that are significantly more stringent than those necessary for removal of $SiHCl_3$ impurity alone. As shown in FIG. 1 and 2, it has been found that the relative photochlorination rates of C—H containing compounds as shown in FIG. 1 relative to Si—H containing compounds as shown in FIG. 2 are significantly lower. Because of the relatively low reaction rates of C—H containing compounds, three expedients—(1) relatively hignh chlorine concentration and (2) a relatively high incident ultraviolet light intensity with (3) relatively long reactor residence times—are employed. A large amount, preferably an excess, of chlorine molar equivalents relative to the C—H present is utilized. This concentration is established by introducing at least one equivalent of chlorine into the SiCl₄ for each equivalent of C—H present. (The amount of C—H is monitored by conventional techniques such as infrared absorption spectroscopy.) Ultraviolet light with a wavelength in the range of 240 to 400 nm is used to produce atomic chlorine from the chlorine compounds introduced.

In addition to the chlorine concentration, the ultraviolet light intensity and the residence time are controlled to ensure the substantial reaction of C—H bonds which are difficult to chlorinate. Generally, the product of the light intensity (measured in watts per unit area of incident light reaching the SiCl₄, having a wavelength below 400 nm), and the residence time should be larger than $5 \times 10^5$ μW sec/cm², preferably larger than $5 \times 10^6$ μW sec/cm². Since obtainable light intensities from economic sources are generally less intense than 5000 μW/cm² in the wavelength range below 400 nm, a residence time significantly greater than employed for $SiHCl_3$ is generally necessary to satisfy the $5 \times 10^5$ μW sec/cm², and, thus, to adequately chlorinate the C—H impurities. Residence time is conveniently expressed by the ratio V/Q where V is the volume of the reactor tank used in the photochlorination and Q is the flow rate, i.e., the rate at which the glass former is introduced and removed from the reactor. As discussed, generally, for typical lamp intensities utilized in removing the objectionable C—H containing compounds, residence times in the range 2000 to 5000 seconds, preferably 2500 to 3500 seconds, are employed.

The bulk of the HCl produced by photochlorination should be removed by techniques such as gas-liquid extraction to ensure appropriate elimination of impurities such as silanols in the subsequent distillation steps of the purification process. The bulk removal of HCl also allows a broader range of acceptable distillation columns used in subsequent steps. However, essentially complete removal of HCl before distillation causes excessive SiCl₄ loss. Thus, for this further reason the combination of a gas-liquid extraction method, 7, and a first distillation column, 9, is important. The removal of the bulk of the HCl (together with removal of excess Cl₂) is accomplished by gas-liquid extraction techniques. In a preferred embodiment, a counter-current stripper is employed. For example, a packed column with a counterflow between the glass former and an inert medium is employed, e.g., the photochlorinated glass former is introduced at the top of the column and an inert gas flow such as a nitrogen gas stream is introduced at the bottom of the column. For removal of the bulk of the HCl and Cl₂ present, inert gas to liquid molal flow ratios in the range 0.5 to 2.0 are advantageously employed. The inert gas stream carries off volatile products such as HCl and Cl₂ through the top of the column while the liquid glass former exits from the bottom of the column. In a preferred embodiment, a cooled condenser at the top of the column returns glass former to the columns so that it is not lost with the HCl and Cl₂ containing inert gas flow.

The stripper does not remove iron, silanols, or the heavier C—Cl compounds formed by the photochlorination of C—H containing compounds. In this regard, although substantially all C—H containing compounds are at least partially chlorinated, it is possible to have initially more than one C—H in an impurity and to photochlorinate less than all these C—H entities within the impurity. These partially chlorinated impurities are still capable of degrading fiber quality. However, even partial chlorination of an impurity elevates its boiling point significantly above that of SiCl₄. Since SiCl₄ has a relatively low boiling point, i.e., 57 degrees C., this elevation allows relatively easy separation in a distillation column of the less volatile impurities from the more volatile SiCl₄. Thus, the combination of a photochlorinator and a second distillation column, 10, that removes impurities with a boiling point higher than that of SiCl₄, produces advantageous results.

Nevertheless, a single column—that removes such higher boiling materials—is inadequate to bring the purity of the glass former to the desired level. Impurities such as HCl and silanols are essentially unaffected by the previously described distillation column, 10. Consequently, a series of two distillation columns, 9 and 10, comprising the previously described first and second columns, is employed. These columns are designed to yield a desired purity level and a desired recovery ratio, i.e., the fraction of $SiCl_4$ entering a distillation column that is ultimately recovered as purified product. Purity levels desirable for optical fiber applications have been previously discussed. Because of the cost of $SiCl_4$ (and the even higher cost of $GeCl_4$) recovery ratios in the range 90 to 99 percent, preferably in the range 94 to 98 percent, are generally desirable. In fact, for $GeCl_4$ because of its high cost recovery ratios as high as 99.99 percent are not precluded. (However, the less pure the starting material, the less its cost and, generally, the lower the tolerable recovery ratio. Similarly, the more expensive the product, the higher the tolerable recovery ratio. Both $SiCl_4$ and $GeCl_4$ are corrosive and it is difficult to dispose of them. Therefore, excessively small recovery ratios are not desirable.) The recovery ratio and purity level are determined by (1) the reflux ratio of the distillation column, i.e., L/D where L is the molal liquid flow rate through the upper part of column and D is the molal rate of distillate removed from the column at the top, and (2) the number of theoretical plates, stages, or the number of transfer units (for a packed column) of the distillation column. (See R. E. Treybal, *Mass Transfer Operations*, McGraw-Hill, New York (1968) for definition of plates and transfer units.)

The reflux ratio is also important in another regard for obtaining the desired purity. The glass former before introduction in the distillation column, 10, that removes less volatile impurities is first introduced at an intermediate point, 12, in a distillation column, 9, that has a reflux ratio in excess of 8, preferably in excess of 35, with at least 5 theoretical plates. This first column, 9, in combination with the stripper causes efficient conversion of the silanols to compounds which do not degrade optical fibers and also substantially removes any remaining more volatile impurities such as residual $Cl_2$ which have boiling points lower than that of the glass former. Reflux ratios lower than 8 do not allow sufficient refluxing of the $SiCl_4$ consistent with a suitable recovery ratio.

In the first column, the lighter impurities, e.g., HCl and $Cl_2$, are removed from the top of the column and the $SiCl_4$ is removed from the bottom. This $SiCl_4$ is then introduced into a second column, 10, e.g., a packed distillation column, for further purification to remove the heavier impurities as previously discussed. Besides removing high boiling chlorinated compounds, soluble iron and iron containing particulate matter are also removed by this second distillation. The reflux ratio of the second column and the number of theoretical plates used are much lower than those employed for the first column since the product is removed from the top of the column and a numerically small reflux ratio (on the order of 1.0) corresponds to a relatively large quantity of $SiCl_4$ vapor per unit time reaching this portion of the column. However, reflux ratios below 0.1 are typically undesirable since below this value excessively large physical dimensions are required or inadequate removal of impurities with boiling points above that of the glass former occurs.

As previously discussed, the distillation columns should have advantageous reflux ratios and an advantageous number of plates in order to achieve the desired purification. The exact dimensions and configuration of the distillation column employed to achieve these parameters are chosen by conventional techniques. (See Trebal, supra, for the method of calculating the necessary height and cross section for a given configuration of a distillation column to achieve the desired parameters.) Typically for both distillation columns, it is desirable to utilize a packed column, e.g., a column containing glass packing, for example, one-quarter inch glass rings. Such a packed column has appropriate properties when a column of diameter in the range of approximately 4 to 6 inches and a height in the range 7 to 10 feet is employed. For the second distillation column, it is also desirable to use a packed column, e.g., a column containing glass packing, for example, rings one-quarter inch in diameter. To achieve the desired properties for this type column, cross-sectional dimensions in the range 3 to 5 inches with heights in the range 5 to 8 feet are employed. A variety of column configurations are possible and columns other than packed columns are employable provided that the desired parameters are maintained. However, it has been found convenient to use packed columns with dimensions as indicated because these distillation columns are easily constructed from materials, e.g., glass, which do not deteriorate in the presence of $SiCl_4$ and which do not introduce additional impurities into the product.

After the $SiCl_4$ has been processed, it is generally desirable to cool it by conventional techniques such as by passing through a heat exchanger, 15. It is possible to store the purified material for future use or to use the material directly in the manufacture of optical fibers. Typically, C-H containing compounds are reduced to less than 10 ppm, hydroxyl groups initially present are reduced to less than 10 ppm, Si-H impurities are reduced to less than 10 ppm, and Fe impurities are reduced to less than 10 ppb by the subject process. Occasionally when extremely impure $SiCl_4$ is processed, the desired degree of purification is not totally achieved. It is useful to monitor the impurities in the output of the system, for example, by I.R. spectroscopy, 16, and further partially or totally recycle this output if the purity is less than the desired level. The monitoring capability also provides an indication, if recycling is not desirable, that processing parameters should be adjusted to improve purity.

The following example is illustrative of the parameters used to construct the subject apparatus and perform the subject purification process:

EXAMPLE 1

Epitaxial grade $SiCl_4$ was purchased from Texas Instruments Company. This grade of $SiCl_4$ has impurity levels of 7000 ppm of $SiHCl_3$, 300 ppm C—H 200 ppb of iron, and 40 ppm silanol. Two-tenths of a percent by weight of chlorine was introduced into the $SiCl_4$. After chlorination, the $SiCl_4$ was pressure transferred into a holding tank, 20, having a capacity of approximately 75 gallons. Silicon tetrachloride was continuously drawn from the holding tank at a rate of 100 ml per minute. As $SiCl_4$ was withdrawn from this tank, it was replaced by further aliquots of the material. The material withdrawn from the tank was passed through a bank of filters, 23, formed from glass wool and from a fine Teflon mesh filter having a mesh size of approximately 100. The filter path was approximately 6 inches. (This initial filter removes the bulk of the particulate matter.)

The filtered material was then introduced continuously into a photochemical reactor, 27. The tank of the reactor had approximately a 6 liter capacity having a diameter of approximately 9 inches and having a height of 12 inches. The tank was constructed of Pyrex glass about three-eighths of an inch thick. Ultraviolet fluorescent light tubes (conventional low pressure Hg lamps with a coating for black light) having a length approximately equal to the height of the tank were positioned around the tank at equal intervals so that their long axes were parallel with the long axis of the tank. These light bulbs produce an incident intensity on the tank of approximately 3 mW/cm$^2$ in the 300 to 400 nm wavelength range.

The SiCl$_4$ was withdrawn from the tank at a continuous rate of 100 ml per minute. The material was then introduced at the top of a nitrogen gas stripper, 7. This stripper was formed from a Pyrex glass cylinder of approximately 2 inches in diameter and 2 feet long. The cylinder was filled with one-eighth inch glass helices. Dry nitrogen gas was simultaneously and continuously introduced at the bottom of the cylinder at a rate of approximately 20 liters per minute. The nitrogen gas exited from the top of the cylinder and the SiCl$_4$ exited from the bottom of the cylinder. The exiting nitrogen gas was introduced into a condenser at the top of the stripper which recovered any SiCl$_4$ vapors and allowed them to flow back down through the packing. The condenser was approximately 12 inches long and was cooled with a circulating heat transfer fluid.

The output from the stripper was introduced two-thirds of the way up the height of a distillation column, 9, so that the flow was directed down the column. This column was approximately 15 feet in height and 4 inches in diameter. In the column there were four packed sections, each being approximately 20 inches long, and each having the packing supported by a Teflon mesh. Hollow glass cylinders one-half inch in length having a wall thickness of approximately one-sixteenth of an inch and being approximately one-quarter inch in diameter were employed as packing. A 20 liter boiling flask, 30, at the base of the column was heated by a conventional electric heating mantle. The heating mantle supplied approximately 1500 W to the flask. The reflux ratio for this column was approximately 50 to 1. At the top of this first column a condenser (at approximately 5 degrees C.) was provided to recover any SiCl$_4$ vapors which escaped from the column and to redirect these condensed vapors into the column.

Approximately 95 to 100 ml per minute of material was removed continuously from the flask, 30. This material was introduced one-third of the way up the height of a second column, 10. The second column was approximately 15 feet in height and 3 inches in diameter. There were four packed sections of 18 inches each of which was packed and supported as described for the first column. A 20 liter flask, 37, at the bottom of the distillation column was heated by a conventional heating mantle which supplied approximately 1100 W. This configuration produced a reflux ratio of approximately 1. A condenser was used to condense SiCl$_4$ vapors exiting from the top of the distillation column. The output from this condenser was introduced into a reflux splitter, 40, which removed approximately one-half of the condensed SiCl$_4$ and reintroduced approximately one-half the condensed SiCl$_4$ into the column. The resulting SiCl$_4$ had impurity levels of less than approximately 5 ppm Si—H, C—H, OH, HCl and less than 2 ppb of iron.

What is claimed is:

1. A process for purifying chloride glass formers employed in optical fiber fabrication comprising the steps of (1) photolchlorinating said chloride glass former by subjecting a source of chlorine and said chloride glass former to ultraviolet light for a desired reaction time wherein the product of the intensity of said ultraviolet light and the length of said reaction time is at least $5 \times 10^5$ $\mu$W sec/cm$^2$, (2) removing the bulk of the HCl gas formed by said photochlorination, (3) introducing said chloride glass former in a first distillation column under conditions where the reflux ratio of said first column is at least 8, and then (4) distilling the product from said first distillation column in a second distillation column and recovering the purified glass former from said second distillation column.

2. The process of claim 1 wherein said chloride glass former is SiCl$_4$.

3. The process of claim 1 wherein said chloride glass former is GeCl$_4$.

4. The process of claim 1 wherein the bulk of said HCl produced is removed by counter-current gas stripping.

5. The process of claim 4 wherein said counter-current gas stripping is done with nitrogen gas.

6. The process of either claim 5, 4, 2 or 1 wherein the reflux ratio of said second distillation column is approximately 1.

7. The process of either claim 5, 4, 2 or 1 wherein the recovery rate of said first column is in the range of 90 to 99 percent.

8. The process of claim 7 wherein said reflux ratio of said distillation column is approximately 1.

9. The process of claim 1 wherein the recovery ratio of said second column is in the range of 94 to 99 percent.

10. The process of claim 8 wherein the recovery ratio of said second column is in the range of 90 to 99 percent.

11. The process of claim 1 including the step of filtering said chloride glass former.

12. The process of claim 1 including the step of monitoring the purity of said chloride glass former.

* * * * *